Patented June 23, 1953

2,643,245

UNITED STATES PATENT OFFICE 2,643,245

COPOLYMERS AND COPOLYMER EMULSIONS OF SALTS OF MONOALKYL ESTERS OF MALEIC ACID

Wilfred K. Wilson, Springfield, Mass., assignor to Shawinigan Resins Corporation, Springfield, Mass., a corporation of Massachusetts No Drawing. Application May 29, 1951, Serial No. 228,968

10 Claims. (Cl. 260—78.5)

This invention relates to copolymers of vinyl esters with salts of monoalkyl esters of maleic acid and to processes of producing the same.

Much effort has been expended to prepare resin dispersions which have an indefinite shelf life and which are unaffected by extreme weather conditions encountered in transporting the dispersions to the consumers. One method that was partially successful was to spray dry the dispersion. The dried powder was stable and the large transportation expense of shipping the aqueous dispersion was substantially reduced. However, during the spray drying step, the particles tended to weld together to form gross agglomerates that would not break down when the powder was slurried in the suspension medium. The reconstituted dispersion is always significantly inferior to the original dispersion.

Another troublesome problem in the manufacture of synthetic resins concerns the elimination of small amounts of surface active agents that remain in the resin which has been made in a suspension or emulsion polymerization system. Extensive washing fails to remove entirely the impurity which gives the product many undesirable properties especially in regard to clarity, water sensitivity, and discoloration when exposed to light or heat.

An object of this invention is to provide modified vinyl ester polymers in the dry state which are easily dispersed in water to form excellent emulsions. Another object is to provide a method of polymerizing monomers in an aqueous system to form pearls or give resin dispersions without the aid of an emulsifying agent. Other problems which this invention solves will be apparent from the description which follows.

These and other objects are attained by copolymerizing in an aqueous system, 10 mols of a vinyl ester of an aliphatic acid with 0.25–1 mol of a salt of a monoester of maleic acid. It has been known that vinyl esters can be copolymerized with maleic acid and its esters but only in approximate molar proportions and in a solvent or bulk process.

In order that the invention may be fully understood, the following examples are given by way of illustration. It is to be understood that the invention is not limited to the specific details of the examples. Where the term "parts" is used, it signifies parts by weight.

Example I

In a large jacketed polymerization kettle fitted with a quadrant-type agitator, 1.0 part of concentrated ammonium hydroxide (58% NH4OH) was added to a mixture of 7.0 parts of monoisopropyl maleate, 100 parts of water, 100 parts of monomeric vinyl acetate and 1.6 parts of benzoyl peroxide.

The mixture was then brought to reflux temperature and held at reflux for 90 minutes, stirring throughout. The copolymer product was in the form of fine beads which were separated from the reaction medium by centrifuging. The copolymer beads were air-dried at 70° C. for three hours.

100 parts of the dried product, when stirred in 400 parts of dilute ammonium hydroxide, dispersed to become an excellent resin-in-water emulsion with a pH of 8.0. The viscosity of the emulsion was 60 centipoises at 20° C. An air-dried film cast from the emulsion will not redisperse in water.

The beads produced in Example I are stable indefinitely and may be dispersed at any time or used as beads. If an emulsion is made in one step as in Example II, the dried emulsion film is water dispersible to a large extent.

Example II

These components were charged into a jacketed polymerization kettle:

6.6 parts of monoisopropyl maleate
2.0 parts of concentrated ammonium hydroxide (58%)
10.0 parts of vinyl acetate
100 parts of water
0.8 part of potassium persulfate The batch was heated, with stirring, to 73° C. and held between 70° C. and 80° C. for three hours during which time 82.0 parts of vinyl acetate were slowly added. The product was an extremely fine copolymer emulsion. The analysis of the emulsion was:

| | |
|---|---|
| Particle size | Less than 1.5 microns in diameter. |
| Total solids | 49.2%. |
| pH | 5.6. |
| Viscosity | 45 cp. |
| Freeze stability | Recovered from repeated freezings. |
| Water resistance of air-dried film. | Re-emulsified. |
| Storage stability | Excellent. |
| Copolymer viscosity (8.6 grams in 100 cc. of benzene). | 15 cp. at 20° C. for the portions soluble in benzene. |

The films cast from emulsions made in this one-step process can be dispersed in water, unlike the one made by the two-step process in Example I. The more hydrophilic properties of this emulsion are important in applications where a temporary, easily removed film is desired.

An emulsion more similar to the one produced by the two-step process of Example I may be made by adding all of the vinyl ester at the start. The technique used in this example of keeping the vinyl ester concentration below a certain limit produces a finer particle size emulsion. If some copolymer is formed before the bulk of the vinyl ester is added, gross particles will not form.

Although, for illustration purposes, the above examples show the copolymerization of vinyl acetate with ammonium monoisopropyl maleate, the invention is not limited thereto.

The process of this invention is applicable to compounds containing a vinylidene group such as vinyl esters, vinyl halides, olefin benzenes such as styrene, alpha methyl styrene, etc. and vinyl ketones. The most valuable and unexpected results are obtained, however, when a vinyl ester of lower aliphatic acids containing 2–6 carbon atoms is used as one of the co-monomers. Examples of these vinyl esters are vinyl acetate, vinyl propionate, vinyl butyrate, vinyl valerate and vinyl hexoate, and mixtures thereof. Other monomers which are usually copolymerized with these compounds to vary the properties may also be added here but not in excess of 50% by weight of the vinyl ester.

Maleic acid is only one of a number of alpha, beta-unsaturated ethylenic dicarboxylic acids which may be used. The properties of the maleate monomers are, however, outstanding in this invention. Mesaconic esters, citraconic esters, and others may be used but the emulsions or pearl copolymers formed are not so finely dispersed nor so easily dispersible as the maleate copolymers.

The monoalkyl ester of maleic acid may be prepared by any of the well known methods. The alkyl group may be methyl, ethyl, propyl, isopropyl, butyl, isobutyl, tertiary butyl, amyl, hexyl, cyclohexyl, heptyl, or any alkyl groups containing between 1–10 carbon atoms. Unsaturated groups derived from unsaturated alcohols are not suitable because they enter into the copolymerization or act as cross-linking agents in the product.

The alkyl ester has a significant effect upon the properties of the copolymer. Example III exemplifies the type of product obtained when ammonium maleate is the co-monomer.

*Example III*

Six parts of maleic anhydride were reacted with 2.0 parts of concentrated ammonium hydroxide. The product was copolymerized with 100 parts of vinyl acetate in the presence of 100 parts of water and 0.8 part of potassium persulfate. Ten parts of the vinyl acetate were added initially and the balance throughout the reaction. The batch was held at 70–80° C. for 170 minutes at which time all reflux had ceased. The product was a coarse heterogeneous emulsion. The maleic acid salt inhibited the reaction. The average diameter of the particles was over 10 microns and a substantial proportion of the particles was between 60–100 microns in diameter. The pH of the emulsion was 5.3. An air-dried film cast from the coarse emulsion was not dispersible in water or dilute alkali.

In contrast to this product, the emulsion formed in Example II was very finely dispersed when the salt of a monoalkyl maleate was the co-monomer and it was water and alkali dispersible. All of the alkyl groups disclosed above produce this improvement.

Economic considerations partially govern the choice of the salt of the mono-ester of maleic acid but the compatibility of the product is also a consideration. In general, the end use of the resin or emulsion will be the deciding factor. The copolymers made with salts of monoesters of 1.0 mol of maleic acid with one mol of an alcohol containing up to 8 carbon atoms as the co-monomer, have proved to be most suitable as adhesives, either alone or compounded with other resins and extenders.

The remaining carboxyl group on the mono-ester may be reacted with basic ammonium or alkali metal compounds. Examples of these are ammonium hydroxide, sodium hydroxide, potassium hydroxide, sodium bicarbonate, potassium bicarbonate.

The amount of basic reacting ammonium or alkali metal compound reacted with the monoalkyl maleate markedly influences the properties and the physical form of the product. When less than one-half of the carboxyl groups of the monoester have been neutralized, the bead or pearl polymers are formed. When more than one-half have been neutralized, an emulsion is formed. The dividing line between a coarse dispersion and fine beads is only a matter of terminology but, in general, the average particle size decreases with a decrease in the proportion of unreacted carboxyl groups. The basic reacting compound may be reacted with the monoester before the copolymerization, during the copolymerization, or after the product is formed.

When ammonium compounds are reacted with the mono-ester, films from the copolymer emulsions made as in Example II may be made non-reemulsifiable by heating. Air-drying the films from emulsions made by the two-step process of Example I is sufficient to prevent reemulsification. Sodium or potassium salts of monoalkyl maleates cannot be made non-reemulsifiable by heating. Treatment with multivalent metal compounds such as alum or barium hydroxide will precipitate the copolymer emulsions and replace the hydrophilic sodium, ammonium or potassium groups with hydrophobic groups. This property of these emulsions is most useful in paper coating and loading applications.

Because the alkali metal or ammonium monoalkyl maleate reacts very rapidly under optimum conditions, the product formed is not completely homogeneous. 0.15–1.5 mols of the monoalkyl maleate salt combined with 10 mols of a vinyl ester form useful products but all of the new properties herein disclosed may be obtained when 0.25–1.0 mol of the monoalkyl maleate are copolymerized with 10 mols of an unsaturated compound containing a vinylidene group.

If the addition of the monoalkyl maleate salt to the reaction is delayed, as the vinyl acetate was in Example II, a completely soluble product is obtained which is disclosed in my co-pending application Serial No. 228,969, filed May 29, 1951.

While it is one of the objects of this invention to provide extremely fine resin dispersions in the absence of emulsifying agents, surface active agents and hydrophilic colloids may be present during the polymerization or when the copolymer beads are being dispersed for certain purposes. For example, if the viscosity of the emulsion is too low for some applications, it may be thickened during or after the polymerization with natural or synthetic gums or colloids, or both. Polyvinyl alcohol is satisfactory for this purpose. It should be emphasized, however, that the presence of surface active agents, emulsifying agents, surface tension depressants or hydrophilic colloids is not necessary or even generally desirable in this process. While most resins prepared in an aqueous system contain small amounts of emulsifying agents which greatly affect the color, stability and utility of the resin, this invention provides a resin with none of these drawbacks.

This product may be made in any of the conventional equipment commonly used for polymerization or copolymerization reactions. The temperature at which the reaction is carried out is not critical. Any convenient temperature may be used. Reflux temperature is suitable for most combinations of monomers. Economic considerations usually demand that the copolymerization be carried out as rapidly as possible with due regard to safety factors. Since the copolymerization reaction is exothermic, some means of dissipating the heat that is generated must be available. When pearl or bead copolymers are being produced, keeping a low ratio of monomers to water will aid in the control of the reaction. The copolymerization reaction may be carried out under superatmospheric pressure. Pressure equipment is necessary when the reaction is run at temperatures above the boiling point of the monomers.

Various water-soluble and oil-soluble polymerization catalysts may be used in place of those shown in the examples, such as peracetic acid, sodium perborate, potassium perborate, sodium persulfate, potassium persulfate, sodium peroxide, potassium peroxide, urea peroxide, benzoyl peroxide, lauryl peroxide, ditertiary butyl peroxide, oleyl peroxide, toluyl peroxide, acetyl peroxide, and the like, as well as mixtures of two, three or more of these and other catalysts. In certain cases, the action of light may also be helpful in expediting the polymerization in the presence of catalysts of the type mentioned above. Water-soluble peroxides are most suitable for emulsion production in one-step as in Example II. Oil-soluble peroxides seem better adapted to the two-step process as exemplified in Example I. Excellent results may be obtained, however, with any of these catalysts or mixtures in either system. Some catalysts, for example, hydrogen peroxide, are active both in the oil and water phases. This type is suitable for either the one-step or two-step process.

The amount of catalyst or combination of catalysts may be substantially varied, the amounts employed in any particular charge depending on such factors as the vinyl ester being polymerized, the viscosity desired in the copolymer, etc. In general, small amounts are sufficient and usually an amount is used which will provide 0.0005 to 0.2 part of available oxygen for every 100 parts of the monomeric compounds to be copolymerized. All of the catalyst or catalysts may be added at the start or in a continuous or semi-continuous manner throughout the polymerization.

Other substances may be added to change or control the pH of the reaction medium, to assist the action of the catalyst, or to limit the viscosity of the copolymer. Examples of these modifiers are formic acid, sodium bicarbonate, acetic acid, toluene, methyl ethyl ketone, acetone, acetaldehyde, iron salts, etc.

The copolymerization time is dependent upon a number of factors and is generally not critical. Increasing the amount of catalytically available oxygen and increasing the temperature of the reaction will reduce the time necessary for copolymerization. Increasing the pressure will also have the same effect. The temperature, pressure and catalyst concentration can be adjusted so as to give any desired copolymerization time. With all the monoalkyl maleate salts and vinylidene compounds, the above conditions may be used to set a reaction cycle which will be suitable for economical production of the product.

This new product may not be made in a continuous manner. All or substantially all of the salt of the monoalkyl maleate monomer must be added at once, before the co-monomer has polymerized sufficiently to tend to agglomerate in the water phase. As pointed out above, the vinylidene monomer may be added slowly as the copolymerization progresses but this may not be done with the other monomer.

This new copolymer has many advantages which are not found in any of the known synthetic resins. While many water-soluble polymers and copolymers are known, this product has the novel property of dispersing in water to form an excellent stable dispersion in water. This property is most useful in applications where a semi-permanent or temporary adhesive or coating is required which must be removed quickly and easily.

The process herein disclosed is also capable of wide application because it affords a type of built-in protection system that stabilizes the resin during polymerization in water without incorporating the deleterious effects usually associated with emulsifying agents.

It is to be understood that the invention is not limited to the specific embodiments shown above except as defined by the appended claims.

What is claimed is:

1. A batch copolymerization process which comprises reacting together in an aqueous medium and in the presence of a polymerization catalyst, 10 mols of a vinyl ester of an aliphatic acid containing 2–6 carbon atoms with 0.25–1.0 mol of a monoalkyl ester of maleic acid reacted with an alkaline reacting material selected from the group consisting of ammonium and alkali metal compounds.

2. A process according to claim 1 in which less than 1.0 mol of the alkaline reacting material has been reacted with 2.0 mols of the monoalkyl ester of maleic acid.

3. A process according to claim 1 in which more than 1.0 mol of an alkaline reacting material has been reacted with 2.0 mols of the monoalkyl ester of maleic acid.

4. A process according to claim 1 in which less than 1.0 mol of the alkaline reacting material is reacted with 2.0 mols of the monoalkyl ester of maleic acid before copolymerization with the vinyl ester and more alkaline material is added after the co-monomers have reacted to neutralize the remaining carboxyl groups.

5. A process as defined in claim 1 in which not over 0.15 mol of the vinyl ester is initially introduced into the polymerization system and the balance is introduced throughout the polymerization period.

6. A process as defined by claim 1 in which the alkaline reacting material is an ammonium compound.

7. A dispersible copolymer of 10 mols of a vinyl ester of a lower aliphatic acid containing from 2 to 6 carbon atoms with 0.25 to 1.0 mol of a monoalkyl ester of maleic acid reacted with an alkaline reacting material taken from the group consisting of ammonium and alkali metal compounds, made according to the process as defined in claim 1.

8. A batch copolymerization process which comprises reacting together in the presence of a polymerization catalyst and in an aqueous medium, 10 mols of vinyl acetate with 0.25 to 1.0 mol of monobutyl ammonium maleate.

9. A batch copolymerization process which comprises reacting together in the presence of a polymerization catalyst and in an aqueous medium, 10 mols of vinyl acetate and 0.25 to 1.0 mol of monoisopropyl ammonium maleate.

10. A process according to claim 9 in which the monoisopropyl ammonium maleate was prepared by reacting less than 1.0 mol of a basic reacting ammonium compound with 2.0 mols of monoisopropyl maleate.

WILFRED K. WILSON.

No references cited.